(12) United States Patent
Nguyen et al.

(10) Patent No.: US 6,636,372 B1
(45) Date of Patent: Oct. 21, 2003

(54) ACCUMULATING READ CHANNEL PERFORMANCE DATA

(75) Inventors: Dat Nguyen, San Jose, CA (US); James Wilson Rae, Rochester, MN (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/550,440

(22) Filed: Apr. 17, 2000

Related U.S. Application Data

(60) Provisional application No. 60/130,162, filed on Apr. 20, 1999.

(51) Int. Cl.$^7$ .................................. G11B 5/09
(52) U.S. Cl. ............................. 360/31; 360/53
(58) Field of Search .................. 360/31, 25, 48, 360/51

(56) References Cited

U.S. PATENT DOCUMENTS

| | | | |
|---|---|---|---|
| 5,068,754 A | 11/1991 | Garde | |
| 5,392,295 A | 2/1995 | Coker et al. | |
| 5,490,091 A | 2/1996 | Kogan et al. | |
| 5,563,746 A | * 10/1996 | Bliss | 360/53 |
| 5,583,705 A | 12/1996 | Ziperovich et al. | |
| 5,666,237 A | 9/1997 | Lewis | |
| 5,754,353 A | 5/1998 | Behrens et al. | |
| 5,761,212 A | 6/1998 | Foland, Jr. et al. | |
| 5,978,162 A | 11/1999 | Behrens et al. | |
| 5,987,634 A | 11/1999 | Behrens et al. | |
| 6,005,731 A | 12/1999 | Foland, Jr. et al. | |
| 6,014,768 A | 1/2000 | Lee et al. | |
| 6,016,463 A | 1/2000 | Ng | |

\* cited by examiner

*Primary Examiner*—David Hudspeth
*Assistant Examiner*—Varsha A. Kapadia
(74) *Attorney, Agent, or Firm*—Fish & Richardson P.C.

(57) ABSTRACT

Systems and methods for accumulating data relating to the performance of one or more components of a read channel are described. In one aspect, a programmable channel quality monitor is operable to accumulate performance data corresponding to a recorded test data sequence spanning two or more data sectors of the magnetic medium. The channel quality monitor preferably is incorporated in a disk drive system. A method of accumulating performance data from a read channel also is described. In accordance with this inventive method, an original test data pattern is written to multiple data sectors of the magnetic medium. The original test pattern is read from the multiple data sectors of the magnetic medium to produce a readback test pattern. In this method, performance data relating to a comparison of the original test pattern and the readback test pattern is accumulated.

31 Claims, 8 Drawing Sheets

ACCUMULATING READ CHANNEL PERFORMANCE DATA

CROSS-REFERENCE TO RELATED APPLICATIONS

This application claims priority from U.S. Provisional Application No. 60/130,162, filed Apr. 20, 1999.

TECHNICAL FIELD

This invention relates to systems and methods for accumulating data relating to the performance of one or more components of a read channel.

BACKGROUND

In a magnetic disk storage system, a read channel extracts information stored on a magnetic disk and delivers that information to a host system (e.g., a computer). The magnetic disk is formatted with a plurality of concentric data tracks, each of which is configured to store a fixed quantity of data in the form of magnetic transitions on the disk surface. A spindle motor rotates the magnetic disk and a magnetic transducer positioned adjacent to the disk senses the magnetic transitions on the disk surface and produces an input read signal corresponding to the recorded data. The read channel includes a plurality of components for reconstructing the recorded data from the input read signal received from the transducer. Sampled amplitude read channels include components (e.g., a digital wave shaping circuit and a digital filter) for equalizing the input read signal into a predetermined partial response (e.g., PR4 or EPR4) that enables the output of the read channel to be approximated as a linear combination of time delayed pulses modulated by a binary sequence.

The operation of a sampled amplitude read channel may be optimized by adjusting one or more of the read channel components that equalize the input read signal. Programmable digital read channels enable technicians to program read channel components to improve the data detection capability of the channels and to optimize the read channels for different disk drive systems. In order to optimize a read channel, the technician must monitor the performance of the channel under prescribed test conditions. For example, in one optimization technique, a known test pattern is written to a sector of a magnetic disk and compared to the pattern detected by the read channel. Such a comparison may be used to compute one or more statistical performance measures (e.g., mean of squared sample errors) characteristic of the current read channel configuration. In order to perform a meaningful statistical analysis, however, a sufficient quantity of data must be collected. Various techniques (e.g., introducing noise into the read channel) have been proposed to reduce the amount of data needed to perform statistical analyses on the read channel output. In addition, programmable channel quality monitors have been developed to help accumulate test data for calibrating a read channel. For example, U.S. Pat. No. 5,987,634 describes a channel quality circuit in a sampled amplitude read channel. The channel quality circuit generates a test data pattern that is written to a sector of a formatted magnetic storage disk. As the test pattern is read from the storage disk sector, the channel quality circuit accumulates performance data from the read channel components. Gating logic is programmed to accumulate only the particular performance data of interest.

SUMMARY OF THE INVENTION

The invention features systems and methods for accumulating performance data from a read channel configured to extract data symbols from a magnetic medium having a plurality of formatted data sectors. In accordance with this inventive scheme, a programmable channel quality monitor is operable to accumulate performance data corresponding to a recorded test data sequence spanning two or more data sectors of the magnetic medium.

Embodiments may include one or more of the following features.

The channel quality monitor preferably is programmable to delay the accumulation of performance data during a delay period corresponding to a programmed number of data symbols following a received trigger signal. The channel quality monitor may be programmable to begin the delay period after a sync mark signal is received, or after a read gate signal is received. The channel quality monitor preferably includes a delay counter configured to provide an end-of-delay signal after the programmed delay period has expired.

The channel quality monitor preferably is programmable to accumulate a programmed quantity of performance data. The channel quality monitor may be programmable to accumulate performance data corresponding to data symbols from multiple data sectors of the magnetic medium. The channel quality monitor preferably includes a measurement counter configured to provide an end-of-measurement signal after the programmed quantity of performance data has been accumlated. The channel quality monitor may be programmable to accumulate performance data corresponding selected data symbols of each magnetic medium sector from which data is accumulated. The accumulation of performance data may be suspended during a delay period corresponding to a programmable number of data symbols at the beginning of each sector from which data is accumulated.

In one aspect, the invention features a disk drive system. The system includes at least one magnetic storage disk having a plurality of formatted data sectors. The system also includes at least one transducer configured to extract an encoded data signal from the magnetic storage disk. The system has a read channel configured to extract encoded data symbols from the encoded data signal. The system also has a programmable channel quality monitor operable to accumulate performance data corresponding to a recorded test data sequence spanning two or more data sectors of the magnetic medium.

In another aspect, the invention features a method of accumulating performance data from a read channel configured to extract data symbols from a magnetic medium having a plurality of formatted data sectors. In accordance with this inventive method, an original test data pattern is written to multiple data sectors of the magnetic medium. The original test pattern is read from the multiple data sectors of the magnetic medium to produce a readback test pattern. In this method, performance data relating to a comparison of the original test pattern and the readback test pattern is accumulated.

A total number of sectors in error preferably is determined. A sector may be determined to be in error if a single byte in the sector is in error, or if more than one byte in the sector is in error.

Advantages of the invention include that a disk drive technician may readily collect a large quantity of performance data, because the test data patterns written to the magnetic medium may span multiple data sectors. In addition, the disk drive technician may perform a wide variety of different performance tests with a test data pattern stored in one or more sectors of the magnetic medium (e.g., a sector error test that spans a plurality of sectors).

Other features and advantages of the invention will become apparent from the following description, including the drawings and the claims.

DETAILED DESCRIPTION OF SPECIFIC EMBODIMENTS

Figure 1A:
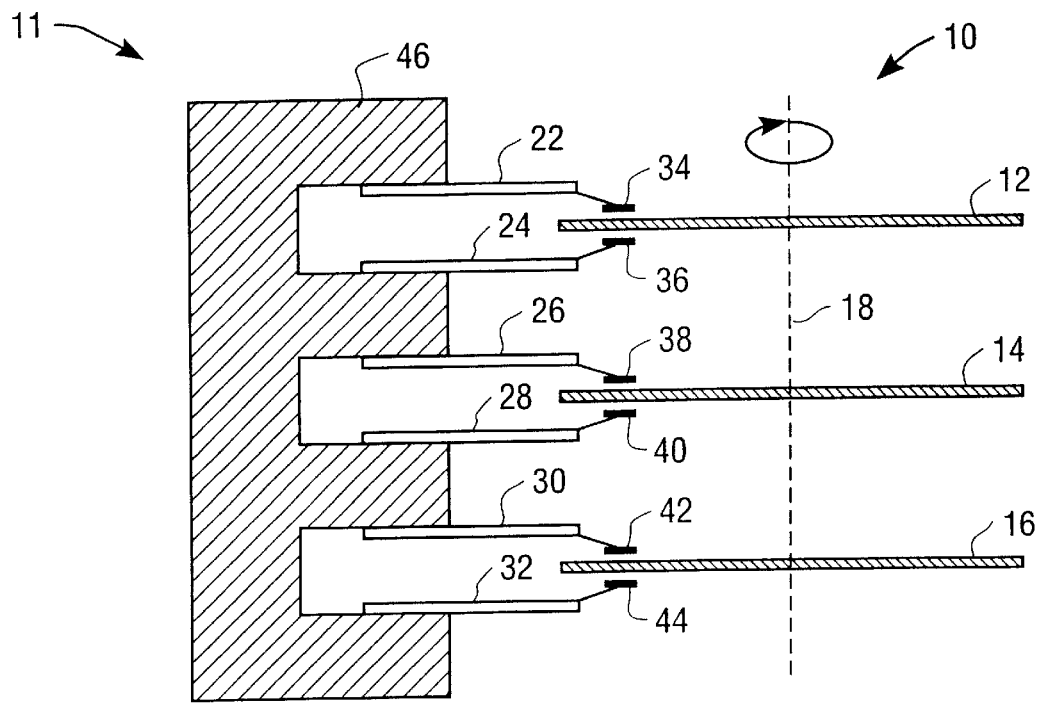
FIG. 1A is a diagrammatic side view of a magnetic disk storage system, including an actuator assembly, a plurality of magnetic storage disks, and a plurality of head supports each of which is coupled to a respective read/write transducer.
Figure 1B:
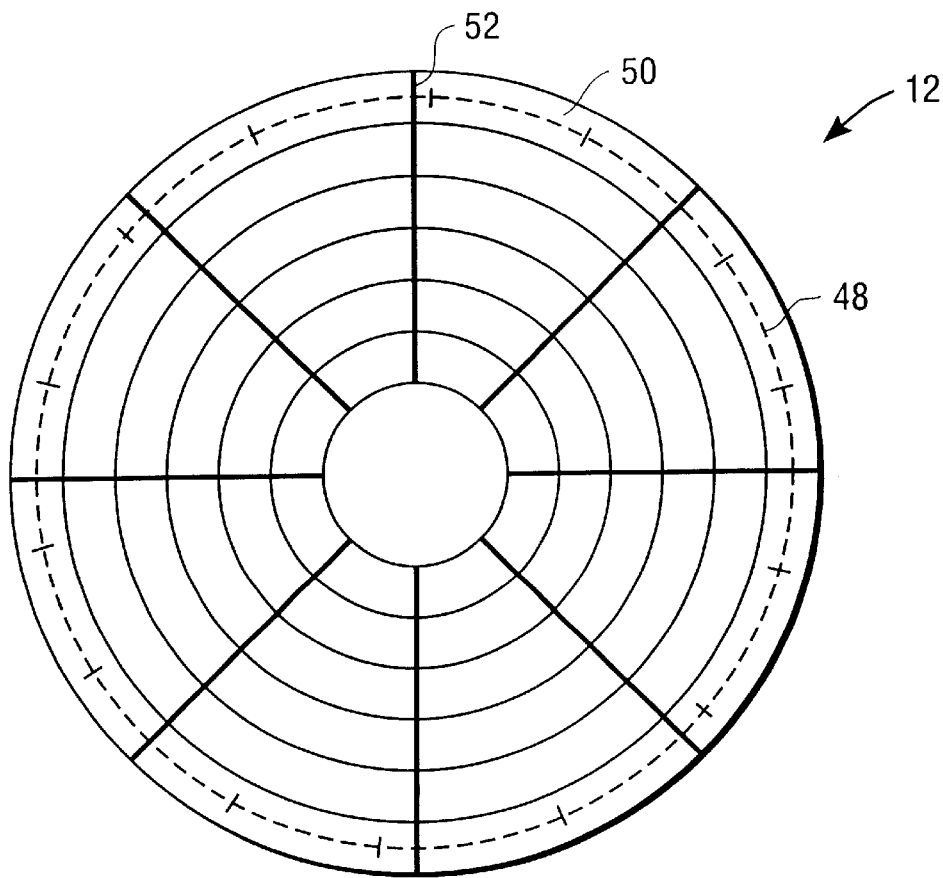
FIG. 1B is a diagrammatic top view of a formatted magnetic storage disk.
Figure 1C:
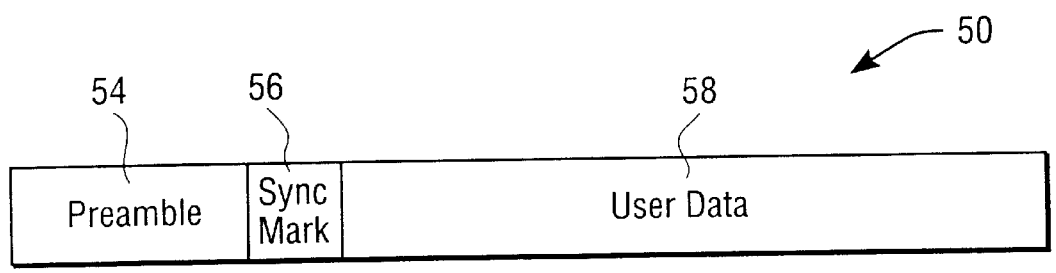
FIG. 1C is a diagrammatic view of a data symbol format of a sector of the magnetic storage disk of FIG. 1B.

Referring to FIGS. 1A–1C, a magnetic disk storage system 10 includes a head stack assembly 11 and a plurality of magnetic storage disks 12, 14 and 16, each of which is configured to rotate about an axis 18. Head stack assembly 11 includes a plurality of head supports 22, 24, 26, 28, 30 and 32, each of which is coupled by a gimbal mechanism to a respective slider 34, 36, 38, 40, 42 and 44. Each slider 34–44 supports one or more magnetic read/write transducers (e.g., magnetoresistive heads) that are operable to write data to and read data from magnetic storage disks 12–16. Slider movement is controlled by an actuator assembly 46 that controls the positions of head supports 22–32. Head supports 22–32 are configured to bias sliders 34–44 against the surfaces of disks 12–16. The rotation of disks 12–16 produces air bearings between sliders 34–44 and the surfaces of disks 12–16 that lift sliders 34–44 above the surfaces of disks 12–16 by a small, substantially constant distance.

As shown in FIGS. 1B and 1C, each magnetic storage disk 12–16 stores information in magnetic recording media supported on the disk surfaces. The information typically is stored in an annular pattern of concentric data tracks 48, as shown in FIG. 1B for disk 12. Each data track 48 is formatted into a plurality of sectors 50 separated by servo fields 52. As a disk rotates, data stored in different sectors of the disk may be accessed by moving a slider to the appropriate locations on the disk surface. Servo fields 52 are used to verify the track and sector positions of transducers 34–44 and to align transducers 34–44 with a desired track 48. In a fixed block architecture, each data track 48 is divided into a predetermined number of equal-sized sectors 50. Each data sector 50 typically has an associated identification (ID) field that contains a data sector identifier and other information (e.g., flags that identify defective sectors). Typically, data sectors 50 are identified by a logical block number. The host computer sends a list of logical block numbers to be written or read, and a disk drive controller converts the logical block number information into zone, cylinder, head and sector values. The servo system locates the desired zone, cylinder and head, and the disk drive begins reading the sector ID fields until a match is found. After the appropriate sector ID field has been read, the disk drive reads data from (or writes data to) a user data block in the sector corresponding to the matched sector ID field. As shown in FIG. 1C, each sector 50 is formatted into a data sequence that includes a training preamble 54, a sync mark 56, and a user data block 58. Training preamble 54 is used to set the sampling frequency and phase of the read channel, and sync mark 56 is used to identify the beginning of user data block 58.

Figure 2:
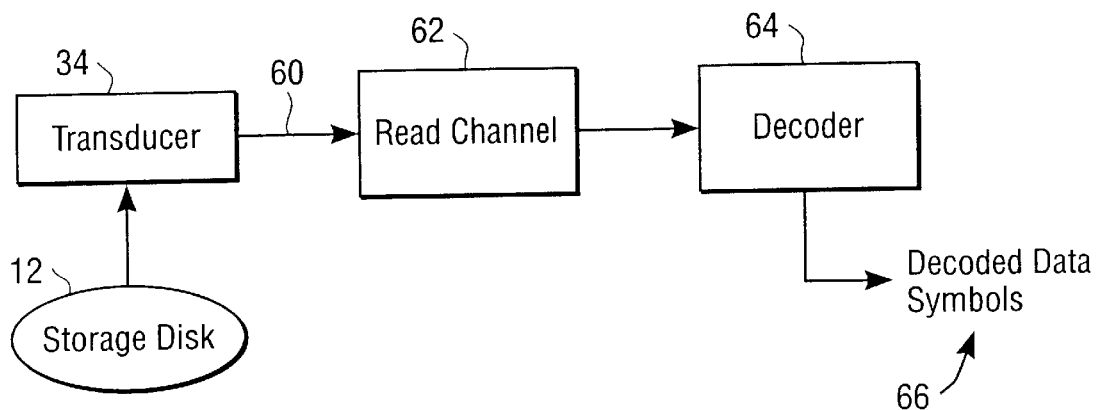
FIG. 2 is a block diagram of a read channel of the magnetic disk storage system of FIG. 1A.

Referring to FIG. 2, in one embodiment, a transducer 34 generates an encoded data signal 60 from localized magnetic fields stored on magnetic storage disk 12. Transducer 34 transmits encoded data signal 60 to a read channel 62, which extracts encoded data symbols from encoded data signal 60 by sampling encoded data signal 60. The extracted data symbols, along with other information, are transmitted to a decoder 64, which generates decoded data symbols 66 from the information received from read channel 62.

As explained in detail below, read channel 62 includes a channel quality monitor that accumulates performance data from read channel 62 and computes statistical performance measures that may be used to improve the operation of read channel 62. The channel quality monitor enables disk drive technicians to readily collect a quantity of data that is sufficient to obtain reliable indications of read channel performance under actual operating conditions. The channel quality monitor also enables a disk drive technician to carry out a wide variety of different performance tests with data stored in one or more sectors of a magnetic medium.

Figure 3:
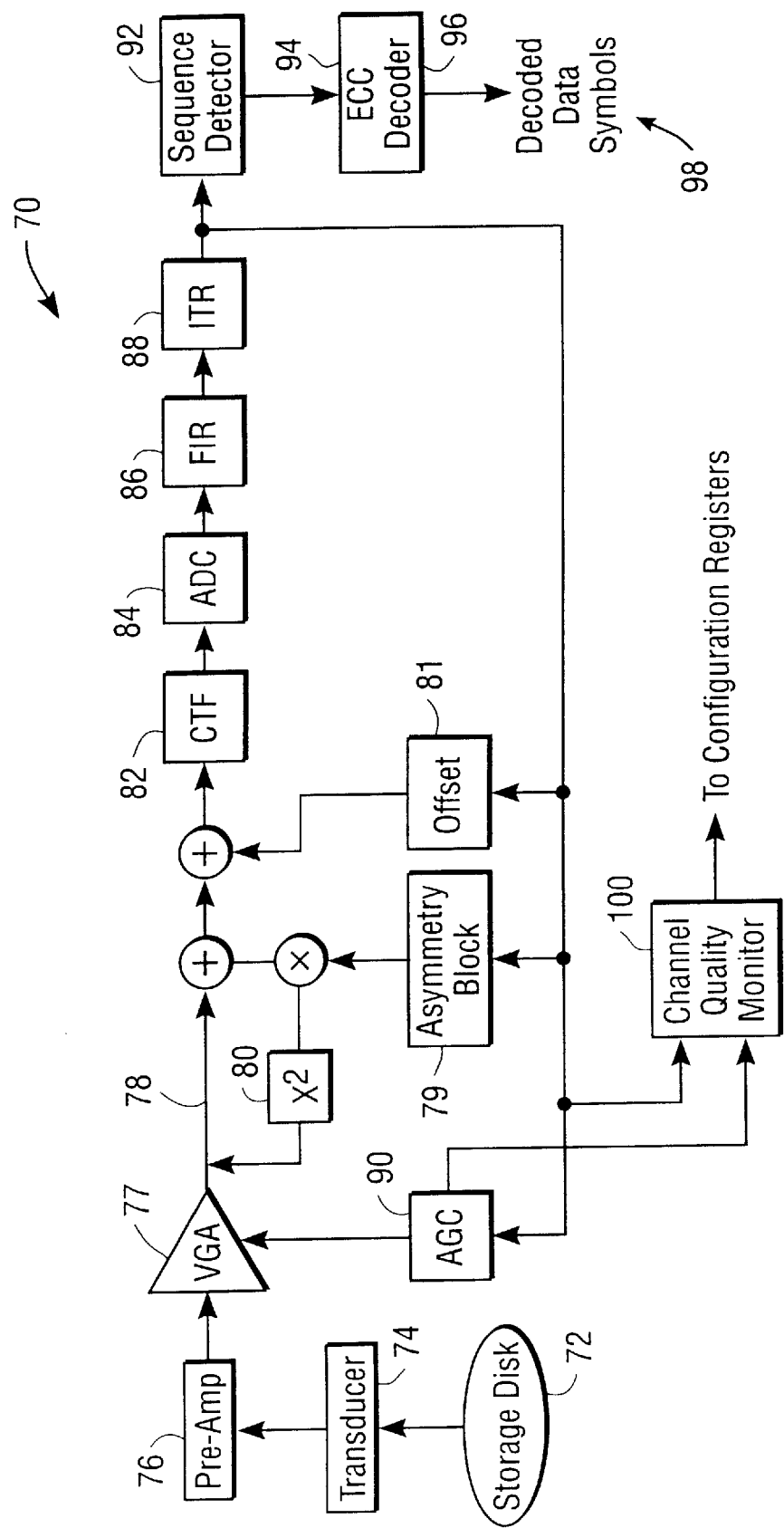
FIG. 3 is a block diagram of an EPRML read/write channel, including a data detector and a channel quality monitor, according to a specific embodiment of the invention.

Referring to FIG. 3, in one embodiment of the invention, an EPRML read channel 70 includes a rotating magnetic storage disk 72 and a transducer 74. Transducer 74 may be positioned by a rotary voice coil actuator operating within a closed loop servo that includes a slider carrying transducer 74 for reading information from (and writing information to) storage disk 72. In a read mode of operation, magnetic flux transitions are induced in a read element of transducer 74 to produce an encoded data signal that is applied to an input of a read preamplifier 76. A variable gain amplifier (VGA) 77 controllably amplifies the encoded data signal to produce a gain-normalized data signal 78. An asymmetry block 79 and a multiplier 80 symmetrize data signal 78, and an offset circuit 81 adjusts the DC offset of data signal 78. An equalizer 82 (e.g., continuous time filter) is configured to provide some (or all) of the equalization to the gain-normalized data signal 78. An analog-to-digital (A/D) converter 84 samples the equalized data signal 78 at the channel rate to provide discrete-time samples of the data signal. A discrete-time finite impulse response (FIR) filter 86 receives and further equalizes the samples to a predetermined spectrum (e.g., PR4, EPR4, or EEPR4). The equalized spectrum is then applied to an input of an interpolated timing recovery (ITR) filter 88 that is configured to produce synchronous samples by digital interpolation of the asynchronous sample stream received from FIR filter 86. The equalized spectrum also is applied to an input of an automatic gain controller (AGC) 90, which adjusts VGA 80 to normalize the gain of data signal 78. The equalized spectrum is analyzed by a sequence detector 92 that is configured to produce detected data symbols 94 representing a maximum likelihood sequence estimate of read channel 70. Detected data symbols 94 are supplied to the input of an error correction code (ECC) decoder 96 for decoding into decoded data symbols 98.

Read channel 70 further includes, a channel quality monitor 100 that collects data samples from read channel 70 and computes one or more statistical measures indicative of the performance of read channel 70. A disk drive technician may program channel quality monitor 100 to collect information corresponding to particular test data patterns stored on magnetic medium 72. The test data patterns may span multiple data sectors of magnetic medium 72, enabling the disk drive technician to readily collect a large quantity of performance data and to perform a wide variety of different performance tests (e.g., a sector error test that spans a plurality of sectors).

Figure 4:
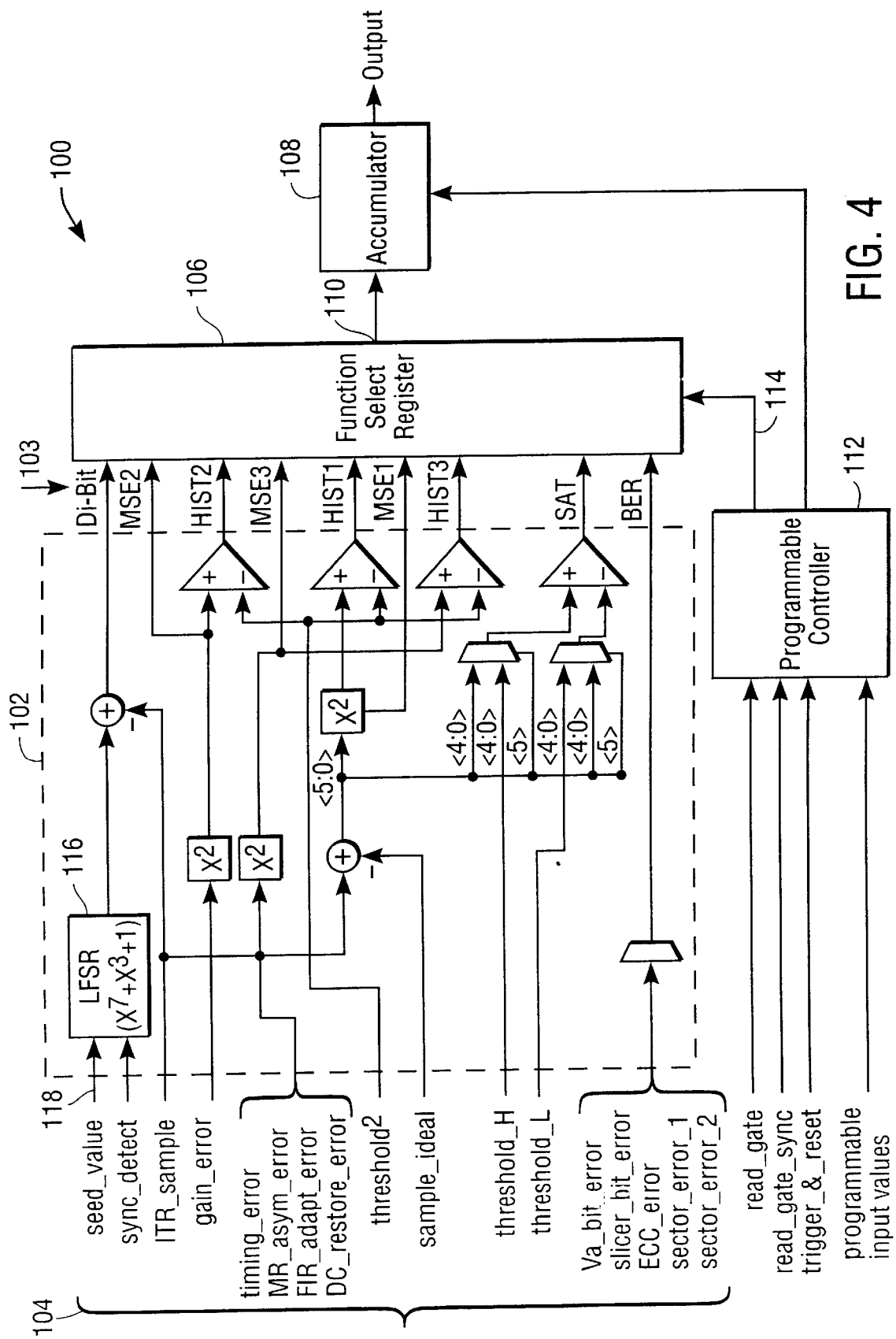
FIG. 4 is a block diagram of the channel quality monitor of FIG. 3, according to a specific embodiment of the invention.

Referring to FIG. 4, according to a specific embodiment of the invention, channel quality monitor 100 includes logic circuitry 102 configured to compute a plurality of statistical performance measures 103 from a plurality of received performance data samples 104. The performance measures are supplied to a function select register 106. An accumulator 108 collects and accumulates samples from an output 110 of register 106. A programmable controller 112 applies a function select signal 114 to an input of register 106 to control which performance measure 103 is supplied to the input of accumulator 108. In one embodiment, channel quality monitor 100 is configured to compute the following statistical performance measures:

TABLE 1

| TEST | DEFINITION |
|---|---|
| MSE1 (referenced to estimated sample value) | $\hat{e}^2 = \Sigma[y_n - \hat{u}_n]^2$ |
| MSE2 (referenced to known sample value) | $\hat{e}^2 = \Sigma[y_n - \hat{u}_n]^2$ |
| MSE3 (error signals) | $\hat{e}_0^2 = \Sigma[y_n]^2$ |
| Surface Analysis | $N(T_L, T_H) = \Sigma I(T_L < y_n < T_H)$ |
| Histogram 1 (referenced to estimate) | $N(e^2) = \Sigma I\{[y_n - \hat{u}_n]^2 > T\hat{e}^2\}$ |
| Histogram 2 (referenced to known sample) | $N(e^2) = \Sigma I\{[y_n - \hat{u}_n]^2 > T\hat{e}^2\}$ |
| Histogram 3 | $N(e^2) = \Sigma I\{[y_n]^2 > T\hat{e}^2\}$ |
| Error Rate | $N(E) = \Sigma I(z_n > 0)$ |
| DiBit Extraction | $D(y) = \Sigma(y_n \times a_n) + (y_n \times a_n - 1))$ |

In Table 1, y(n) is the selected performance data sample 104; $\hat{u}_n$ is the estimated noise-free sample value; $\hat{u}_n$ is the known noise free sample; $a_n$ is the known data; $I(x)$ is an index function, which has a value of 1 if x is true, and has a value of 0 if x is false; $T_n$ are programmable threshold values; and $z_n=1$ if output byte n from decoder 96 is in error, otherwise $z_n=0$.

A user may calculate the real mean square error by dividing the measured square error (MSE1, MSE2, MSE3) by the number of measurements made; this number is accumulated in measurement counter 124. For the MSE1 test, the error is calculated as the difference between the received sample output from ITR 88 and the estimated noiseless sample value. In the MSE2 test, the error is calculated as the difference between the received sample output from ITR 88 and a calculated sample derived from an onboard linear feedback shift register (LFSR) 116. The MSE3 test may be used to measure the standard deviation of loop error signals.

The surface analysis test (SAT) may be used to scan the magnetic medium for defects. For example, a ¼ period constant pattern may be recorded over the area of the magnetic medium to be tested, in which case the readback pattern would be a sine wave with a repeating ±2 pattern. The SAT function counts the number of sample occurrences outside of this pattern.

Bit error rates may be computed for various components of the read channel. For example, the output of a slicer circuit may be compared to known data generated by LFSR 116 to determine bit error rates for the slicer circuit. A similar test also may be performed for a Viterbi detector.

The di-bit extraction test deconvolves a pseudo-random binary readback sequence that previously has been written to a sector as data. The di-bit extraction test may be used to evaluate one sector to determine one value of the di-bit function. Subsequent values are obtained by shifting the phase of the pseudo-random binary sequence that is used to generate known data in the deconvolution equation. Data should be written using the known-data Write mode. In this mode of operation, when a normal write cycle is executed, the device output is a repeating pseudo-binary sequence data pattern that takes the place of normal encoded write data. On readback, the 127 bit pseudo-random binary sequence is derived from LFSR 116, which performs the polynomial recursion $x_{n+8}=(x_{n+7}+x_{n+3}+1)_{mod2}$. In this extraction algorithm, the phase of the pseudo-random binary sequence determines the time variables of the extracted di-bit function. In order to obtain all 127 values of the extracted di-bit, the phase of the pseudo-random binary sequence is incremented by changing the starting value.

The performance measures defined in Table 1 may be applied to a number of different performance data samples 104. Table 2 identifies (with an "X") the different data samples 104 that may be monitored and the statistical performance measures that may be used to characterize these performance data samples.

TABLE 2

| PERFORMANCE MEASURE | MSE 1 | MSE 2 | MSE 3 | SAT | HIST1 | HIST2 | HIST3 | ERROR | DI-BIT |
|---|---|---|---|---|---|---|---|---|---|
| ITR DATA | X | X | | X | X | X | | | X |
| GAIN ERROR | | | X | | | | X | | |
| TIMING ERROR | | | X | | | | X | | |
| DC RESTORE ERROR | | | X | | | | X | | |

TABLE 2-continued

| PERFORMANCE MEASURE | MSE 1 | MSE 2 | MSE 3 | SAT | HIST1 | HIST2 | HIST3 | ERROR | DI-BIT |
|---|---|---|---|---|---|---|---|---|---|
| MR ASYM. ERROR | | X | | | | X | | | |
| FIR ADPT. ERROR | | X | | | | X | | | |
| SECTOR ERRORS 1 | | | | | | | | X | |
| SECTOR ERRORS 2 | | | | | | | | X | |
| VA BIT ERROR | | | | | | | | X | |
| SLICER BIT ERROR | | | | | | | | X | |
| ECC BER | | | | | | | | X | |

Figure 5:
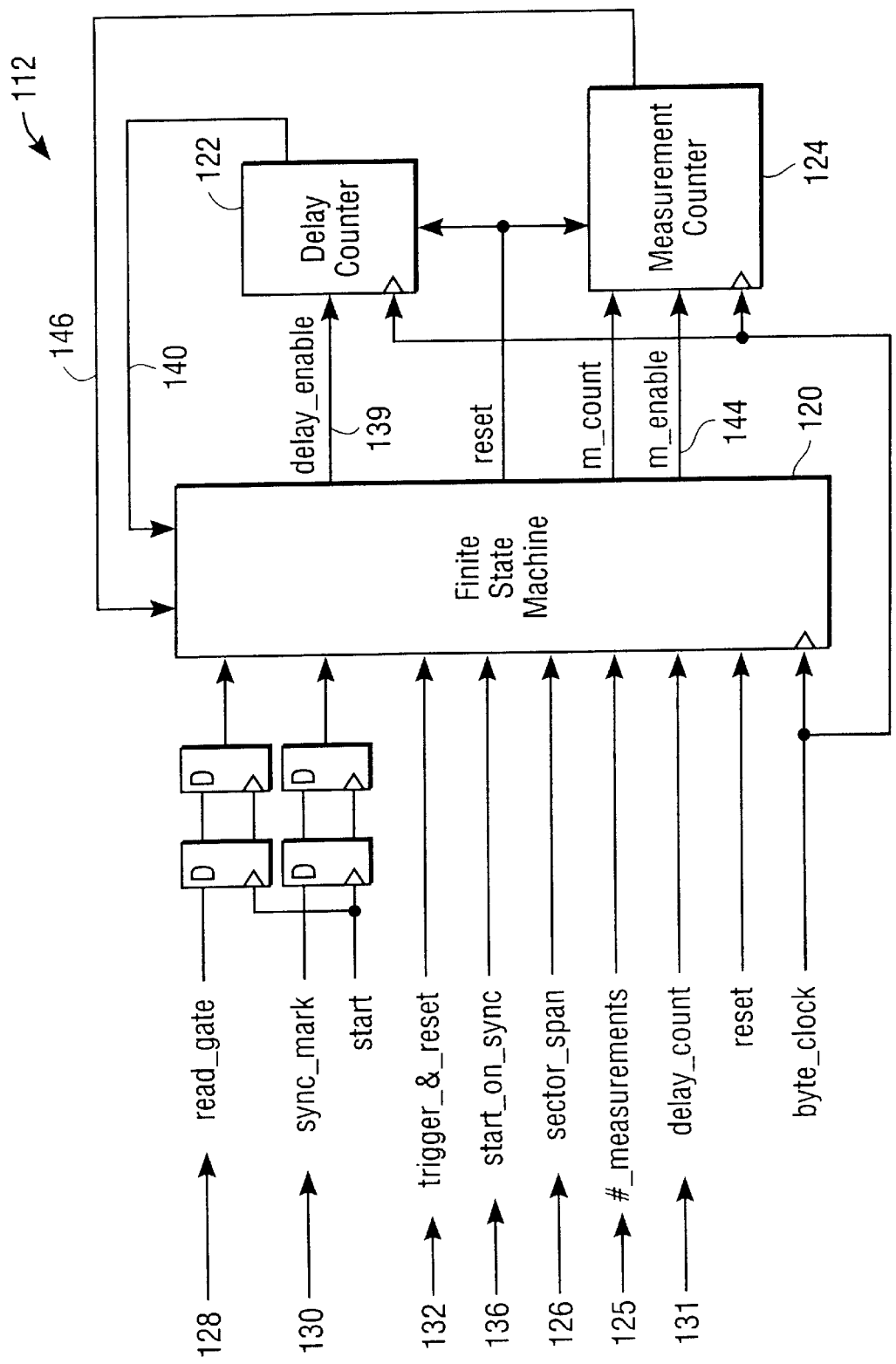
FIG. 5 is a block diagram of a controller for the channel quality monitor of FIG. 4, according to a specific embodiment of the invention.

Referring to FIG. 5, controller 112 includes a finite state machine 120, a delay counter 122 and a measurement counter 124. As explained in detail below, controller 112 choreographs the collection of performance data corresponding to pre-recorded test data stored in one or more data sectors of a formatted magnetic storage medium. In practice, a disk drive technician writes a known test pattern to a magnetic disk and programs controller 112 to accumulate a specified quantity (#_measurements signal 125) of performance data corresponding to the test data sequence written to the magnetic disk. The recorded test data sequence may span multiple data sectors of the magnetic disk, enabling the technician to readily collect sufficient data samples to obtain meaningful statistical performance measures for the read channel. The technician may enable multiple-sector measurement collection by activating a sector_span signal 126. The technician may program controller 112 to operate in an asynchronous mode in which data is accumulated upon receipt of an active read_gate signal 128, or in a synchronous mode in which data is accumulated upon receipt of an active sync_mark detected signal 130. The technician also may program controller 112 to suspend the accumulation of performance data for an initial delay period 131 corresponding to a specified number of data symbols to be processed by the channel before performance data is collected. Delay counter 122 stores the programmed delay count 131, and measurement counter 124 stores a measurement counter 125 corresponding to the specified quantity of performance data to be accumulated. After an initial delay period has expired, delay counter 122 transmits an end-of-delay signal 140 to finite state machine 120 and, after the specified quantity of performance data has been accumulated, measurement counter 124 transmits an end-of-measurement signal 146 to finite state machine 120.

Figure 6:
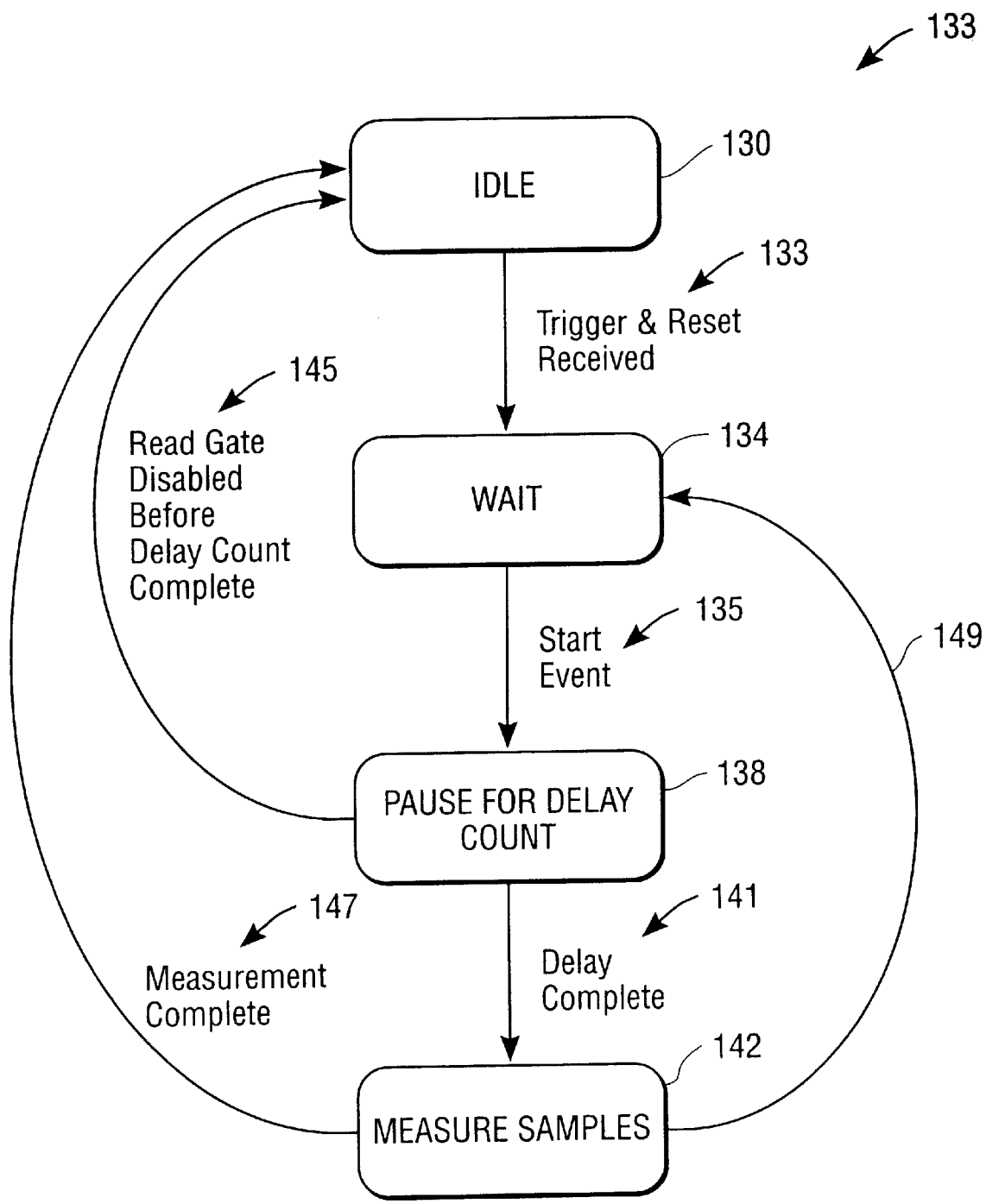
FIG. 6 is a state diagram of a finite state machine for the controller of FIG. 5, according to a specific embodiment of the invention.

Referring to FIGS. 5 and 6, in operation, controller 112 may choreograph the collection of performance data as follows. Initially, controller 112 is in an IDLE state 130. Upon activation of a trigger_&_reset signal 132, state indicators of finite state machine 120, delay counter 122 and measurement counter 124 are reset and finite state machine 120 enters a WAIT state 134 (step 133). Finite state machine 120 exits WAIT state 134 after receipt of an active read_gate signal 128 or after receipt of an active sync_mark signal 130, depending upon the value of a start_on_sync signal 136 (step 135). Finite state machine 120 then enters a PAUSE state 138 in which finite state machine 120 activiates a delay_enable signal 139 that triggers delay counter 122 to count though the specified delay period. Upon receipt of a delay_done signal 140 from delay counter 122, finite state machine 120 advances to a MEASURE-MENT state 142 in which finite state machine 120 enables accumulator 108 to accumulate specified performance data (step 141). Finite state machine 120 also activates a measurement enable (m_enable) signal 144 that triggers measurement counter 124 to count through the specified number of performance data samples. If finite state machine 120 is in PAUSE state 138 when read_gate signal 128 is de-asserted, an error flag is set to 1 and finite state machine 120 returns to IDLE state 130 (step 145). While in MEASURE state 142, performance data samples 103 are accumulated in accumulator 108. Upon receipt of an end-of-measurement signal 146, finite state machine 120 disables accumulator 108 and returns to IDLE state 130 (step 147). The measurement value contained in accumulator 108 and the number of measurements counted in measurement counter 124 may be accessed by a disk drive technician through a serial interface and may be used to compute one or more statistical measures indicative of the performance of the read channel (see, e.g., the performance measures defined in Table 1).

Figure 7A:
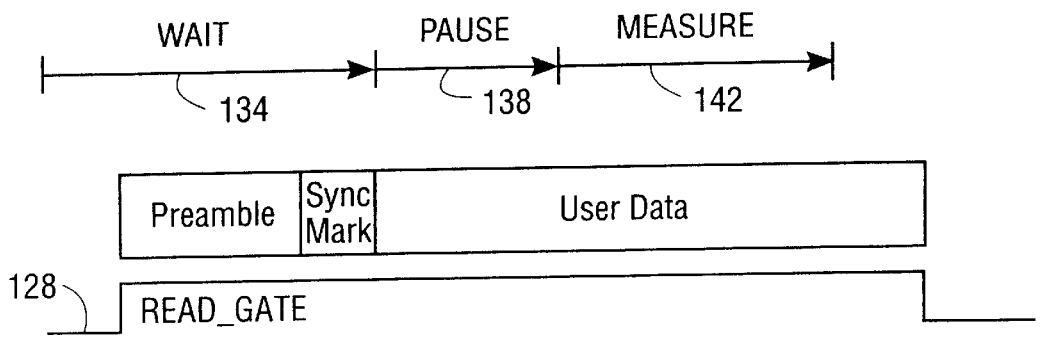
FIGS. 7A–7C are timing diagrams corresponding to different programmable modes of operation for the channel quality monitor of FIG. 4, according to specific embodiments of the invention.
Figure 7B:
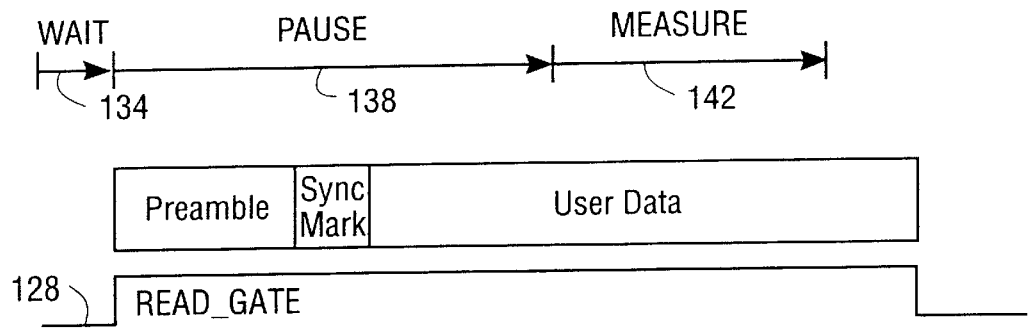
Figure 7C:
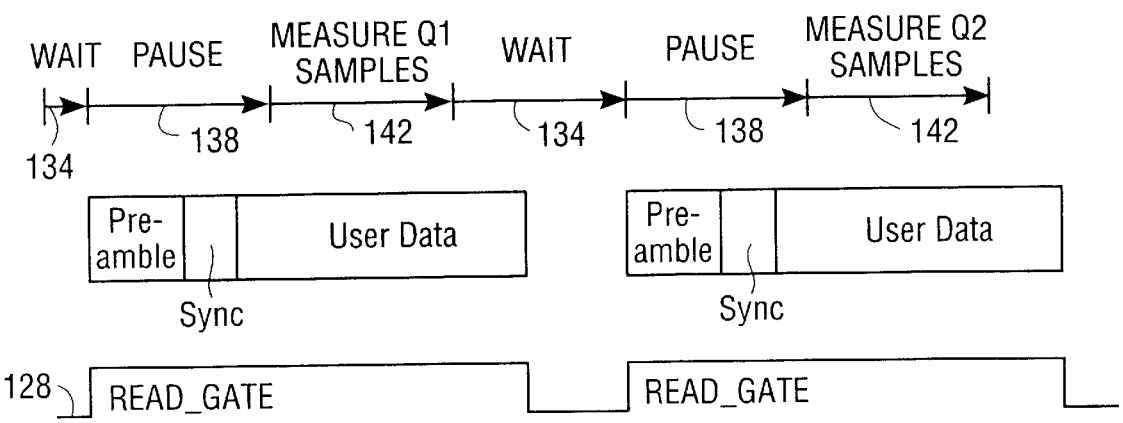

As shown in FIGS. 7A, 7B and 7C, if sector_span signal 126 is de-activated, data accumulates until end-of-measurement signal 146 is activated (FIGS. 7A and 7B), or until the end of the magnetic medium sector being read, as signaled by the de-activation of read_gate signal 128. If sector_span signal 126 is activated, performance data is accumulated until the specified quantity (Q1+Q2) of performance data samples have been accumulated (FIG. 7C). If end-of-measurement signal 146 is not activated when read_gate signal 128 is de-asserted, finite state machine 120 returns to WAIT state 134 (step 149), and steps 135–147 are repeated until the specified quantity of performance data has been collected.

The ability to collect data samples corresponding to multiple magnetic medium sectors allows a disk drive technician to perform a wide variety of performance tests. For example, the technician may perform a sector error test to evaluate the performance of the read channel over multiple data sectors of the magnetic medium. In the statistical performance functions described in Table 1, the measurement independent variable (which increments measurement counter 124) corresponds to the number of data samples (bits) to be measured. In contrast, for a sector error test measurement, the independent variable is the number of sectors to be tested, and the dependent variable is the number of sectors in error.

Figure 8:
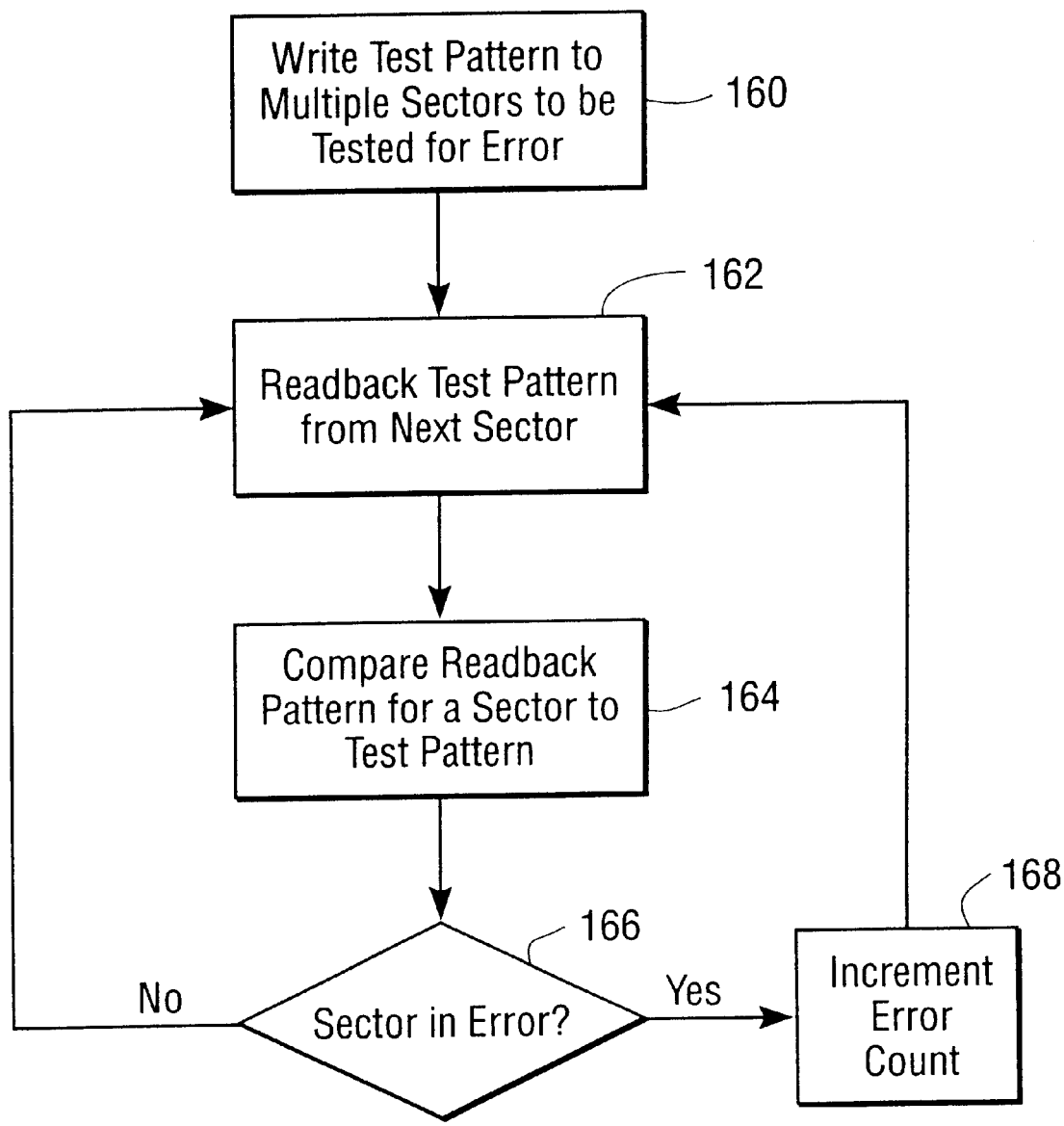
FIG. 8 is a flow diagram of a method of accumulating read channel performance data over multiple data sectors of a magnetic storage medium, according to a specific embodiment of the invention.

Referring to FIG. 8, in accordance with one sector error test, an all $00_h$ byte pattern is scrambled, decoded, and written to multiple sectors of a magnetic medium (step 160). Upon readback, the process is inverted to reconstruct the $00_h$ test pattern for each sector (step 162). Errors are detected by the occurrence of non-00$_h$ bytes (step 164). A sector may be counted as a sector in error in a variety of ways (step 166). In one embodiment (test 1), a sector is counted as a sector in error if it has one or more bytes in error. In another embodiment (test 2), a sector is counted as a sector in error if it has five or more bytes in error. Statistically, for channel error rates of less than $10^{-6}$ errors/bit, most sectors in error will contain only a single error event; however, a single error may corrupt several bytes. When a single error event causes mis-synchronization, hundreds of bytes in error may be generated. Test 1 would count either outcome as one error, whereas test 2 would count as errors only sectors with long bursts of errors. If a sector is determined to be in error (step 166), the error count is incremented (step 168) and the test pattern is read back from the next sector (step 162); otherwise, the next sector simply is readback without incrementing the error count. The process (steps 162–168) is repeated for each sector to be tested.

When a selected error test is performed, finite state machine 120 is set to span multiple sectors and measurement counter 124 is incremented upon de-assertion of read_gate signal 128. After the specified number of sectors has been tested, finite state machine 120 returns to IDLE state 130.

Although the above specific embodiments are used to describe the invention, it is recognized that other embodiments are within the scope of the claims.

What is claimed is:

1. A system for accumulating performance data from a read channel configured to extract data symbols from a magnetic medium having a plurality of formatted data sectors, comprising: a programmable channel quality monitor to accumulate performance data samples corresponding to a recorded test data sequence spanning two or more data sectors of the magnetic medium, wherein the channel quality monitor includes an accumulator to accumulate the performance data samples and a measurement counter to count the number of performance data samples accumulated in the accumulator, wherein the channel quality monitor receives a sector span signal and a signal indicating an end of a sector, and the channel quality monitor is configured such that, while the sector span signal is active, the signal indicating the end of a sector is prevented from triggering a reset of the measurement counter and the accumulator calculates a first performance measure from performance data from at least two data sectors.

2. The system of claim 1, wherein the channel quality monitor is programmable to delay the accumulation of performance data during a delay period corresponding to a programmed number of data symbols following a received trigger signal.

3. The system of claim 2, wherein the channel quality monitor is programmable to begin the delay period after a sync mark signal is received.

4. The system of claim 2, wherein the channel quality monitor is programmable to begin the delay period after a read gate signal is received.

5. The system of claim 2, further comprising a delay counter configured to provide an end-of-delay signal after the programmed delay period has expired.

6. The system of claim 1, wherein the channel quality monitor is programmable to accumulate a programmed quantity of performance data.

7. The system of claim 6, wherein the channel quality monitor is programmable to accumulate performance data corresponding to data symbols from multiple data sectors of the magnetic medium.

8. The system of claim 6, wherein the measurement counter is configured to provide an end-of-measurement signal after the programmed quantity of performance data has been accumulated.

9. The system of claim 6, wherein the channel quality monitor is programmable to accumulate performance data corresponding selected data symbols of each magnetic medium sector from which data is accumulated.

10. The system of claim 9, wherein the accumulation of performance data is suspended during a delay period corresponding to a programmable number of data symbols at the beginning of each sector from which data is accumulated.

11. The system of claim 1, wherein the first performance measure is a measured square error, a surface analysis test, a histogram, an error rate, or a di-bit extraction.

12. A system, comprising:
at least one magnetic storage disk having a plurality of formatted data sectors;
at least one transducer configured to extract an encoded data signal from the magnetic storage disk;
a read channel configured to extract encoded data symbols from the encoded data signal; and
a programmable channel quality monitor to accumulate performance data samples corresponding to a recorded test data sequence spanning two or more data sectors of the magnetic medium, wherein the channel quality monitor includes an accumulator to accumulate the performance data samples and a measurement counter to count the number of performance data samples accumulated in the accumulator, wherein the channel quality monitor receives a sector span signal and a signal indicating an end of a sector, and the channel quality monitor is configured such that, while the sector span signal is active, the signal indicating the end of a sector is prevented from triggering a reset of the measurement counter and the accumulator calculates a first performance measure from performance data from at least two data sectors.

13. The system of claim 11, wherein the first performance measure is a measured square error, a surface analysis test, a histogram, an error rate, or a di-bit extraction.

14. A method of accumulating performance data in a programmable channel quality monitor from a read channel configured to extract data symbols from a magnetic medium having a plurality of formatted data sectors, the method comprising:
activating a sector span signal of the channel quality monitor that includes an accumulator to accumulate performance data samples and a measurement counter to count the number of performance data samples accumulated in the accumulator;
in the channel quality monitor, receiving a signal indicating an end of a sector;
while the sector span signal is active, preventing the signal indicating the end of a sector from triggering a reset of the measurement counter; and
while the sector span signal is active, accumulating performance data samples corresponding to a recorded test data sequence spanning two or more data sectors of the magnetic medium in the accumulator, wherein accumulating performance data samples comprises calculating a first performance measure from performance data from at least two data sectors.

15. The method of claim 14, further comprising the step of delaying the accumulation of performance data during delay period corresponding to a programmed number of data symbols following a received trigger signal.

16. The method of claim 15, wherein the trigger signal is a sync mark signal.

17. The method of claim 15, wherein the trigger signal is a read gate signal.

18. The method of claim 15, further comprising the step of providing an end-of-delay signal after the programmed delay period has expired.

19. The method of claim 15, further comprising the step of accumulating a programmed quantity of performance data.

20. The method of claim 19, further comprising accumulating performance data corresponding to data symbols from multiple data sectors of the magnetic medium.

21. The method of claim 19, further comprising the step of providing an end-of-measurement signal after a programmed quantity of performance data has been accumulated.

22. The method of claim 19, further comprising the step of accumulating performance data corresponding to selected data symbols of each magnetic medium sector from which data is accumulated.

23. The method of claim 22, wherein the accumulation of performance data is suspended during a delay period corresponding to a programmable number of data symbols at the beginning of each sector from which data is accumulated.

24. The method of claim 14, wherein the first performance measure is a measured square error, a surface analysis test, a histogram, an error rate, or a di-bit extraction.

25. A method of accumulating performance data from a read channel configured to extract data symbols from a magnetic medium having a plurality of formatted data sectors, comprising:

writing an original test data pattern to multiple data sectors of the magnetic medium;

reading the original test pattern from the multiple data sectors of the magnetic medium to produce a readback test pattern;

activating a sector span signal of a channel quality monitor that includes an accumulator to accumulate performance data samples and a measurement counter to count the number of performance data samples accumulated in the accumulator;

in the channel quality monitor, receiving a signal indicating an end of a sector;

while the sector span signal is active, preventing the signal indicating the end of a sector from triggering a reset of the measurement counter; and in the accumulator of the programmable channel quality monitor, accumulating performance data samples relating to a comparison of the original test pattern and the readback test pattern, wherein accumulating performance data comprises calculating a first performance measure from performance data from at least two data sectors while the sector span signal is active.

26. The method of claim 25, wherein the first performance measure is a total number of sectors in error.

27. The method of claim 26, wherein a sector is in error if a single byte in the sector is in error.

28. The method of claim 26, wherein a sector is in error if more than one byte in the sector is in error.

29. A programmable channel quality monitor in a read channel, the read channel being configured to extract data from a magnetic medium storing test data in a plurality of data sectors, the channel quality monitor comprising:

an accumulator to accumulate performance data samples corresponding to the test data in the plurality of data sectors; and a programmable controller to cause the accumulator to combine performance data from all data sectors of the plurality of data sectors into a first performance measure, the programmable controller including a measurement counter to count the number of performance data samples accumulated in the accumulator, wherein the programmable controller receives a sector span signal and a signal indicating an end of a sector, and the programmable controller is configured such that, while the sector span signal is active, the signal indicating the end of a sector is prevented from triggering a reset of the measurement counter.

30. The channel quality monitor of claim 29, wherein the first performance measure is a measured square error, a surface analysis test, a histogram, an error rate, or a di-bit extraction.

31. A method for monitoring a read channel with a channel quality monitor, the read channel being configured to extract data from a magnetic medium storing test data in a plurality of data sectors, the method comprising:

activating a sector span signal of the channel quality monitor that includes an accumulator to accumulate performance data samples and a measurement counter to count the number of performance data samples accumulated in the accumulator;

in the channel quality monitor, receiving a signal indicating an end of a sector;

while the sector span signal active, preventing the signal indicating the end of a sector from triggering a reset of the measurement counter; and while the sector span signal is active, accumulating performance data from at least two data sectors of the plurality of data sectors in the accumulator of the channel quality monitor.

* * * * *

UNITED STATES PATENT AND TRADEMARK OFFICE
CERTIFICATE OF CORRECTION

PATENT NO. : 6,636,372 B1
DATED : October 21, 2003
INVENTOR(S) : Dat Nguyen and James Wilson Rae It is certified that error appears in the above-identified patent and that said Letters Patent is hereby corrected as shown below:

Column 10,
Line 39, replace "The system of claim 11," with -- The system of claim 12, --

Column 11,
Line 8, replace "The method of claim 15," with -- The method of claim 14, --

Signed and Sealed this

Twenty-seventh Day of July, 2004

JON W. DUDAS
*Acting Director of the United States Patent and Trademark Office*